United States Patent [19]

Gupta et al.

[11] Patent Number: 5,105,019
[45] Date of Patent: Apr. 14, 1992

[54] PROCESS FOR THE REMOVAL OF CATALYSTS FOR POLYETHER POLYOLS

[75] Inventors: Pramod Gupta, Bedburg; Hans-Joachim Sandhagen; Heinz-Jörg Rosenbaum, both of Dormagen, all of Fed. Rep. of Germany

[73] Assignee: Bayer Aktienfesellschaft, Leverkusen Bayerwerk, Fed. Rep. of Germany

[21] Appl. No.: 459,233

[22] Filed: Mar. 2, 1990

[30] Foreign Application Priority Data

Mar. 11, 1989 [DE] Fed. Rep. of Germany ....... 3907911

[51] Int. Cl.$^5$ .............................................. C07C 41/34
[52] U.S. Cl. ................................................... 568/621
[58] Field of Search ............................................ 568/621

[56] References Cited

U.S. PATENT DOCUMENTS

| | | | |
|---|---|---|---|
| 3,715,402 | 2/1973 | Louvar et al. | 260/613 |
| 3,833,669 | 9/1974 | Gehm et al. | 260/615 |
| 4,029,879 | 6/1977 | Muzzio | 536/4 |
| 4,129,718 | 12/1978 | Muzzio | 568/621 |
| 4,137,396 | 1/1979 | Louvar et al. | 536/4 |
| 4,137,398 | 1/1979 | Muzzio | 568/621 |

*Primary Examiner*—Howard T. Mars
*Attorney, Agent, or Firm*—Joseph C. Gil; Richard E. L. Henderson; Godfried R. Akorli

[57] ABSTRACT

The present invention relates to a process for removing a basic catalyst from a polyether polyol having a hydroxyl number of from 4 to 250 comprising adding from 0.7 to 7 percent by weight of water, based on the polyether polyol, to an alkaline reaction medium containing the polyether polyol at a temperature of from 20° to 120° C.; introducing 1 to 2 times the stoichiometric amount of gaseous carbon dioxide at a temperature of from 75° to 120° C., thereby forming a carbonate salt; and removing the carbonate salt by filtration.

4 Claims, No Drawings

PROCESS FOR THE REMOVAL OF CATALYSTS FOR POLYETHER POLYOLS

BACKGROUND OF THE INVENTION

The present invention relates to a process for the removal from polyether polyols of basic catalysts that remain in these products after their preparation is completed. The removal of catalyst is effected by hydrolysis and introduction of carbon dioxide, with subsequent filtering off of the carbonate formed.

Polyoxyalkylene polyether polyols, also known simply as polyether polyols, are used for the preparation of polyurethanes. The polyether polyols are most commonly reacted with polyisocyanates and give urethane polymers, which can be in the form of either elastomers or semi-rigid or rigid foams. For example, European Application 116,309, German Auslegeschrift 1,929,034, German Offenlegungsschrift 2,019,322, and Ullmanns Encyklopädie der technischen Chemie (Ullmanns Encyclopedia of Industrial Chemistry), vol. 19, page 31 et seq. Polyether polyols can also be used as textile auxiliaries, surfactants, and hydraulic fluids.

The properties of the polyurethanes depend very greatly on the polyether polyols and isocyanates used, as well as the corresponding additives, such as, for example, catalysts. It is therefore necessary for the polyether polyols to be in a very pure form and to be as free as possible from impurities that can act as catalysts in the reaction of polyether polyols and isocyanates.

Polyether polyols can be prepared on a large industrial scale by the polyaddition reaction of alkylene oxides on starter molecules with active hydrogen atoms. For example, Ullmanns Encyklopädie der technischen Chemie (Ullmanns Encyclopedia of Industrial Chemistry), vol. 19, page 31 et seq. Polyether polyols having free hydroxyl groups are obtained, although terminal alcoholate groups can be present because of the alkaline reaction medium. Alcoholate groups can be converted into free hydroxyl groups in a subsequent step. The alkali-containing polyether polyol preparations are generally neutralized with inorganic or organic acids to produce polyether polyols containing hydroxyl groups and aqueous salt solutions. The water is then removed by distillation and the salts are separated off from the polyether polyols by filtration. Alternatively, the polyether polyol can be separated by centrifugation and/or phase separation, either with or without the addition of inert solvents.

If inorganic acids, such as sulfuric acid, phosphoric acid, hydrochloric acid, potassium hydrogen phosphate, and the like, or organic acids, such as citric acid, tartaric acid, and the like, are used for the neutralization, it is necessary to carry out the neutralization up to the exact equivalence point. This precision is intended to assure, on the one hand, a minimum of residual basic alkali salts and, on the other hand, a minimum of excess acid. Furthermore, the alkali salt is often precipitated in such a fine form that filtration is difficult despite the use of filtration aids. The use of strong acids can also lead to side reactions, such as esterification, etherification, and/or dehydration of terminal hydroxyl groups, and/or to the degradation of the polyether chains. Polyethers damaged in this way can contain unpleasant odor components.

Another possible method for removal of the catalyst is hydrolysis of the alcoholate and subsequent phase separation using inert organic solvents. See U.S. Pat. No. 3,715,402. The phase separation can be aided by centrifugation or electrostatic coalescence, but such variants on the process are limited to water-insoluble polyether polyols.

The use of magnesium silicates as absorbents for the removal of aqueous potassium hydroxide is described in a number of patents, for example, German Offenlegungsschrift 2,208,614 and U.S. Pat. Nos. 4,029,879 and 4,137,396. The filtration residue thereby obtained, which consists of potassium hydroxide-magnesium silicate and polyether polyol, is difficult to handle and too problematical to dispose of. Losses in yield are, moreover, relatively high.

U.S. Pat. No. 3,833,669 teaches inter alia that, for the removal of catalysts by neutralization with carbon dioxide, the catalyst is inadequately neutralized and the very fine crystals of alkali metal carbonates are difficultly filtered. Consequently, polyether polyols not having the desired degree of purity are obtained. The formation of sparingly soluble alkali metal-magnesium carbonate double salts is recommended in this patent. The disadvantages of this process include the handling and disposal of the filtration residue. Moreover, the use of large stoichiometric excesses of carbon dioxide (two- to ten-fold, plus waste gas disposal) and magnesium salts (one to 20 times the catalyst content, plus waste disposal) is unsatisfactory. In addition, 0.1 to 1% of the amount of polyether polyol is required when separating off the filtration aids, which additionally makes any possible later use of the residues more difficult.

The object of the present invention was therefore to provide a simple and reliable process for the removal of catalyst residues from polyether polyols which does not have the disadvantages discussed above.

SUMMARY OF THE INVENTION

The present invention thus relates to a process for removing a basic catalyst from a polyether polyol having a hydroxyl number of from about 4 to about 250 comprising
(a) adding from about 0.7 to about 7 percent by weight of water, based on said polyether polyol, to an alkaline reaction medium containing said polyether polyol at a temperature of from about 20° to about 120° C.;
(b) introducing about 1 to about 2 times the stoichiometric amount of gaseous carbon dioxide, based on the amount of base in the alkaline reaction medium, at a temperature of from about 75° to about 120° C., thereby forming a carbonate salt; and
(c) removing said carbonate salt by filtration.

DETAILED DESCRIPTION OF THE INVENTION

It has been found, surprisingly, that if suitable reaction conditions and parameters are chosen, the removal of basic catalysts by carbonate salt formation is very successful. The carbonate salts that are formed precipitate as coarse crystals, so that filtration presents no problems, even without a filtration aid. The polyether polyols thus obtained have residual alkali contents of about 5 ppm. It has also been found that these polyether polyols are practically odorless, in contrast to products which are worked up using mineral acids.

The use of gaseous carbon dioxide advantageously avoids undesirable side reactions, such as esterification or dehydration, allows very easy removal of the excess carbon dioxide, avoids corrosion problems with boler materials, and allows the isolation of practically odorless polyethers.

Suitable polyether polyols for use in the process of the invention have a hydroxyl number of about 4 to about 250 and are prepared by known methods, such as described in Saunders and Frisch, *Polyurethanes: Chemistry and Technology* Part I (1962), pages 32 to 40. The preparation of such polyether polyols typically involves the use of strongly basic catalysts. For example, suitable catalysts that can be removed according to the present invention include alkali metal hydroxides, such as sodium hydroxide, potassium hydroxide, and the like.

The alkali metal carbonates formed in the process of the invention contain metal ions corresponding to those of the alkali metal catalysts originally used to form the polyether polyols. These carbonate salts can be insulated in such pure form that they can be used as raw materials, for example, in the production of glass or ceramics.

The process according to the invention is carried out by the following general procedure. The alkaline polyaddition product, which contains at least some alkoxide groups under the reaction conditions, is hydrolyzed by addition of water, typically at a temperature between about 20° and 120° C. The catalyst is then neutralized by introducing gaseous carbon dioxide at a temperature of about 40° to about 120° C. A subsequent distillation removes the water and completes the crystallization of the carbonate salt, which is then removed by filtration.

In a more specific embodiment of the invention, the alkaline polyaddition product is hydrolyzed by addition of about 0.7 to 7.0 wt.% of water at a temperature of about 20° to about 120° C. (preferably 75° to 120° C.). Gaseous carbon dioxide is then passed through with stirring at 75° to 120° C. in an amount corresponding to about 1 to about 2 times the stoichiometric requirement determined by the amount of base in the alkaline reaction medium. After a post-reaction time of about 0.5 to about 2 hours (preferably 1 to 1.5 hours), the water is removed under atmospheric pressure or in vacuo at a temperature of about 90° to about 130° C. The carbonate salt which precipitates is filtered off, optionally with the assistance of a filtering aid, such as cellulose fibre, or silica gel, if appropriate. The filtrate is dried as before, giving the product polyether polyol.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages and parts are percentages by weight and parts by weight.

PREFERRED EMBODIMENTS OF THE INVENTION

Example 1

To 5,000 g of a polyether of propylene glycol, ethylene oxide, and propylene oxide (OH number 28) prepared using 0.5 wt.% KOH was added 1 wt.% water at 90°0 C. The mixture was stirred for one hour and neutralized with 11.8 g of gaseous carbon dioxide. The mixture was then dried, the carbonate was filtered off, and the filtrate was again dried. The resultant product was analyzed.

| Product parameters: | |
| --- | --- |
| OH number (mg KOH/g): | 28 |
| Viscosity (25° C.) (mPa · s): | 860 |
| Water content (wt. %): | 0.01 |
| Base content (KOH, ppm): | 0.8 |

Example 2

To 5,000 g of a polyether of propylene glycol and propylene oxide (OH number 56) prepared using 0.5 wt.% KOH was added 5 wt.% water at 90.C. The mixture was stirred for one hour and neutralized with 17.6 g of gaseous carbon dioxide. The mixture was then dried, the carbonate was filtered off, and the filtrate was again dried. The resultant product was analyzed

| Product parameters: | |
| --- | --- |
| OH number (mg KOH/g): | 56 |
| Viscosity (25° C.) (mPa · s): | 300 |
| Water content (wt. %): | 0.01 |
| Base content (KOH, ppm): | 0.3 |

Example 3

To 5,000 g of a polyether of propylene glycol, ethylene oxide, and propylene oxide (OH number 28) prepared using 0.5 wt.% KOH was added 5 wt.% water at 90° C. The mixture was stirred for one hour and neutralized with 14.9 g of gaseous carbon dioxide. The mixture was then dried, the carbonate was filtered off, and the filtrate was again dried. The resultant product was analyzed.

| Product parameters: | |
| --- | --- |
| OH number (mg KOH/g): | 28 |
| Viscosity (25° C.) (mPa · s): | 850 |
| Water content (wt. %): | 0.01 |
| Base content (KOH, ppm): | 2.0 |

Example 4

To 5,000 g of a polyether of trimethylolpropane, ethylene oxide, and propylene oxide (OH number 35) prepared using 0.5 wt.% KOH was added 1 wt.% water at 90° C. The mixture was stirred for one hour and neutralized with 12.5 g of gaseous carbon dioxide. The mixture was then dried, the carbonate was filtered off, and the filtrate was again dried. The resultant product was analyzed.

| Product parameters: | |
| --- | --- |
| OH number (mg KOH/g): | 35 |
| Viscosity (25° C.) (mPa · s): | 850 |
| Water content (wt. %): | 0.01 |
| Base content (KOH, ppm): | 5.0 |

What is claimed is:

1. A process for removing a basic catalyst from a polyether polyol having a hydroxyl number of from 4 to 250 consisting essentially of
   (a) adding from 0.7 to 7 percent by weight of water, based on said polyether polyol, to an alkaline reaction medium containing said polyether polyol at a temperature of from 20° to 120° C.;

(b) introducing 1 to 2 times the stoichiometric amount of gaseous carbon dioxide, based on the amount of base in the alkaline reaction medium, at a temperature of from 75° to 120° C., thereby forming a carbonate salt; and
(c) removing the added water, followed by
(d) removing said carbonate salt by filtration.

2. A process according to claim 1 wherein the water is added at a temperature of from 40° to 90° C.

3. A process according to claim 1 wherein the carbon dioxide introduced at a temperature of from 80° to 95° C.

4. A process according to claim 1 wherein one or more filtering aids are used in filtration step (c).

* * * * *